March 10, 1931.  C. E. TARONI  1,795,688
METHOD AND APPARATUS FOR MAKING SPONGE CAKE AND THE LIKE
Filed April 21, 1927  2 Sheets-Sheet 1

Inventor:
CHARLES EDWARD TARONI.
by his Attorney:

March 10, 1931.  C. E. TARONI  1,795,688
METHOD AND APPARATUS FOR MAKING SPONGE CAKE AND THE LIKE
Filed April 21, 1927    2 Sheets-Sheet 2

Inventor:
CHARLES EDWARD TARONI.
by his Attorney

Patented Mar. 10, 1931

1,795,688

UNITED STATES PATENT OFFICE

CHARLES EDWARD TARONI, OF LONDON, ENGLAND, ASSIGNOR TO BAKER PERKINS COMPANY INCORPORATED, OF NEW YORK, N. Y., A CORPORATION OF NEW YORK

METHOD AND APPARATUS FOR MAKING SPONGE CAKE AND THE LIKE

Application filed April 21, 1927, Serial No. 185,587, and in Great Britain May 17, 1926.

This invention relates to the production of sponge cake and the like and the object is to produce said substances in an entirely or substantially entirely automatic manner with the use of a continuous sheet of batter or like material in apparatus including a continuous oven of what is known as the "travelling" type. The use of such continuous sheet of batter is distinct from methods hitherto used in which the production of the sponge cake has been carried out with the use of separate small pieces or sheets baked in individual pans.

Figure 1:
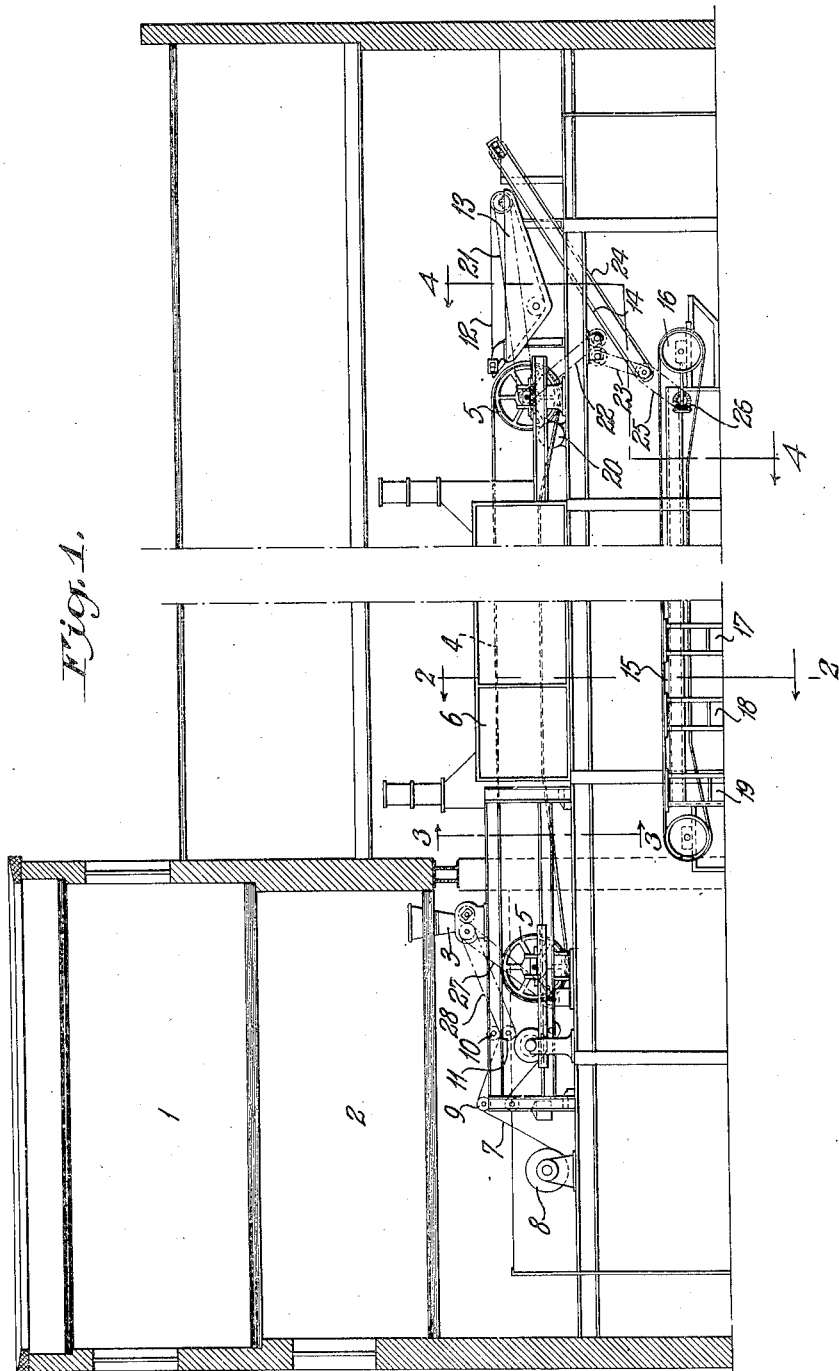
Figure 2:
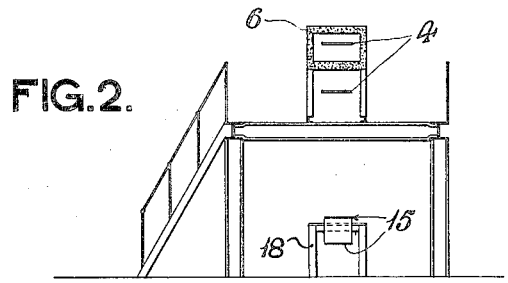
Figure 3:
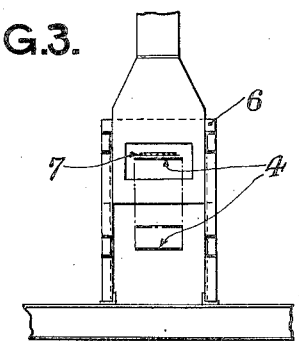
Figure 4:
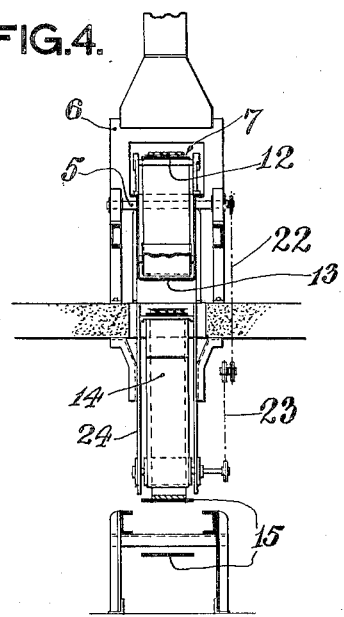

An embodiment of the invention is represented in the accompanying drawing, in which: Figure 1 is a sectional diagram of a complete plant with, however, unnecessary parts thereof removed; and Figs. 2, 3 and 4 are vertical cross-sections thereof taken on lines 2—2, 3—3 and 4—4 of Fig. 1, respectively.

In said drawing, 1 designates a store room for the sponge material, and below the same is a mixing room 2, in the lower corner of which is shown the hopper 3 of a mixing and depositing machine from which the said material is delivered to an endless travelling band 4. This band or conveyor is conveniently formed of thin steel, and mounted on end driving and guiding rollers 5 so that it may travel continuously through an oven or baking chamber 6 of the elongated type and of any convenient or conventional construction.

The said conveyor extends for a sufficient distance beyond the exit end of the oven to enable the baked material to be cooled either in the atmosphere or by passing it through a separate cooling chamber, or the course of the conveyor may be continued as a separate conveyor of conveyors for such cooling purpose.

It is to be noted that the sponge material or batter is not passed directly on to the conveyor 4 but on to a sheet or strip of paper or other thin flexible material which rests upon the web and in the drawing is designated 7, being shown as passing from a roll 8 over a guide roller 9, and thence between a pair of feed rollers 10, 11 and along the surface of the conveyor. This sheet or strip of paper is placed on the conveyor before feeding of the batter commences, and said batter is carried in a continuous sheet together with the paper through the oven or baking chamber 6 and out of the exit of the latter, the paper serving as a base or backing for the batter or sponge material. The paper is then damped, and this is conveniently effected by passing it over an endless band 12 partly immersed in a tank of water 13, or it may be otherwise damped, for example, by spraying liquid thereon. When this damping has been effected, the paper with the baked batter or sponge material thereon is reversed to bring the paper uppermost so that it can be readily stripped; and in the construction shown this reversal is effected by passing the material and paper onto an inclined return conveyor 14 down which they pass with the paper uppermost, the said return conveyor leading the sponge material to still another conveyor 15 mounted on rollers 16. Upon the conveyor 14, or the first part of the conveyor 15, or upon both conveyors 14 and 15 the material is cooled, which may for example be done by means of a fan or fans. Whilst the material is still on the conveyor 15 there may be applied to it jam, cream, or any coating or filling material desired. This application of coating substance may be effected automatically or manually. Either before or after the application of coating material the sheet is cut into lengths, sections or pieces of required size, as by means of a rotary knife or knives mounted above the conveyor 15, or by other appropriate means, the cut pieces being finally coiled, if desired, to form what are known as "Swiss rolls", or other pieces of baked batter or the like may be applied to produce sandwich cakes or similar articles or otherwise dealt with.

The coiling, where performed, may be effected manually on tables 17, 18 and 19 provided at the side of the conveyor 15, or it may be done mechanically, there being well known apparatus available for this purpose, or other appropriate mechanism may be adopted.

Any appropriate means may be used for the moving parts of the apparatus. In the construction illustrated, the main conveyor 4 is driven from an electric motor 20 which is connected with the adjacent roller or pulley 5, and from the latter a chain or belt 21 drives the damping band 12. From this pulley 5 leads a belt or chain gear 22, 23, 24 to drive the reversing conveyor 14, and from the latter another chain and bevel gear connection 25, 26 drives the final conveyor 15. At the feed end of the apparatus, a chain or belt gear 27 drives the feed rollers of the depositing machine 3, and from the latter another belt or chain gear 28 drives the paper feed rollers 10, 11.

What I claim as my invention and desire to secure by Letters Patent of the United States is:—

1. A method of making sponge cake and the like, consisting in conveying a continuous sheet of sponge material through a baking chamber together with and supported on a continuous, flexible backing sheet; continuously reversing the baked material and backing sheet during their further travel after leaving the baking chamber; and stripping the backing sheet from the baked sponge material.

2. A method of making sponge cake and the like, consisting in conveying a continuous sheet of sponge material through a baking chamber together with and supported on a paper backing sheet, carrying said baked material and paper along a cooling course, reversing the said baked material and paper to bring the latter uppermost, and stripping the paper from the baked sponge material.

3. A method of making sponge cake and the like, consisting in conveying a continuous sheet of sponge material through a baking chamber together with and supported on a paper backing sheet, reversing the baked material and paper to bring the latter uppermost, and stripping the paper from the baked sponge material.

4. Apparatus for making sponge cake and the like, comprising in combination an elongated baking chamber, a sole adapted to move continuously therethrough, means for supplying to the sole a continuous backing sheet of flexible material, means for supplying sponge material to said backing sheet in the form of a continuous sheet, and a reversing conveyor onto which the baked sponge material and the flexible backing sheet are deposited with the latter uppermost.

5. Apparatus for making sponge cake and the like, comprising in combination an elongated baking chamber, a sole adapted to move continuously therethrough, means for supplying to the sole a continuous backing sheet of flexible material, means for supplying sponge material to said backing sheet in the form of a continuous sheet, a reversing conveyor onto which the baked sponge material and the flexible backing sheet are deposited with the latter uppermost, and means for damping said backing sheet in order to facilitate stripping it from the sponge material.

6. Apparatus for making sponge cake and the like, comprising in combination an elongated baking chamber, a sole adapted to move continuously therethrough, means for supplying to the sole a continuous backing sheet of flexible material, means for supplying sponge material to said backing sheet in the form of a continuous sheet, a reversing conveyor on'o which the baked sponge material and the flexible backing sheet are deposited with the latter uppermost, means for damping said backing sheet prior to reversal in order to facilitate stripping it from the sponge material, and a final conveyor to which the sponge material is delivered from the reversing conveyor to receive a suitable coating.

7. The herein described method which comprises depositing suitable dough in an elongated mass of considerable length upon a strip of paper, and feeding said dough laden strip through an oven.

8. The herein described method which comprises depositing dough in a mass of considerable length upon a strip of paper, feeding the dough laden strip through an oven onto a suitable support, separating the paper from the dough as it is fed over the support, and thereafter cutting the elongated body of baked dough into pieces.

9. The herein described method of baking in an oven having an endless conveyor for transporting the articles being baked therethrough, comprising depositing suitable dough in a mass of considerable length, upon a strip of paper, superposing the dough laden paper directly upon the endless conveyor of the oven, and separating the paper from the baked dough.

In witness whereof I have signed this specification.

CHARLES EDWARD TARONI.